United States Patent Office 2,790,932
Patented Apr. 30, 1957

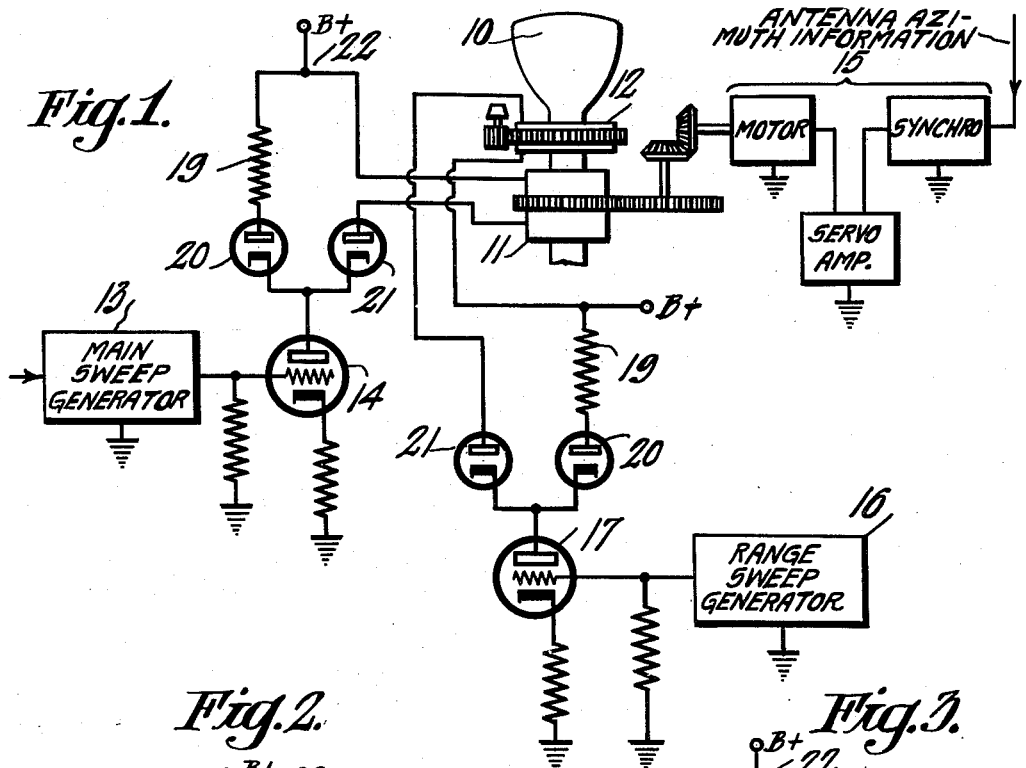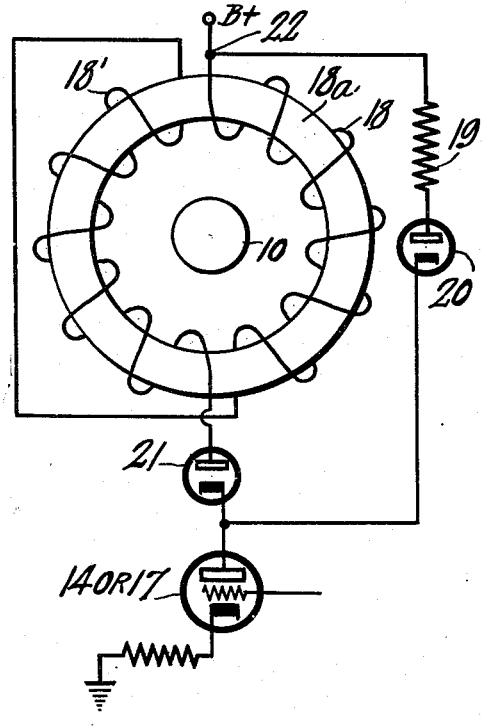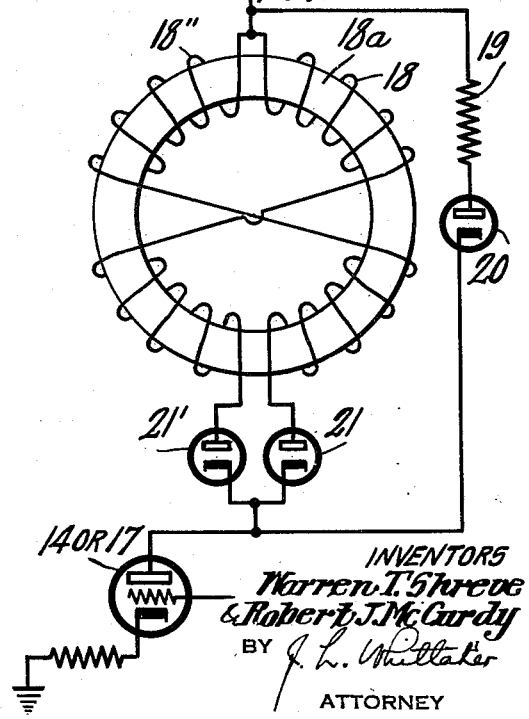

2,790,932

CATHODE RAY TUBE DEFLECTION YOKE INTERFERENCE ELIMINATION

Warren T. Shreve, Philadelphia, Pa., and Robert J. McCurdy, Bridgeboro, N. J., assignors to Radio Corporation of America, a corporation of Delaware Application May 19, 1949, Serial No. 94,122

13 Claims. (Cl. 315—26)

This invention relates generally to flux producing electrical circuits and more particularly to such circuits in which flux interaction is prevented between coils positioned in close proximity to one another such as the deflection coils on the cathode ray tube of a radar indicator system.

The invention is especially adapted to use in conjunction with radar systems of the type described and claimed in the application of Shreve and Arensberg, Serial No. 96,048 filed May 28, 1949, now Patent No. 2,737,653, issued March 6, 1956 which systems employ two separate deflection coils arranged in close proximity with one another on the neck of the cathode ray tube of a P. P. I. (plan-position-indicator) system, one of which coils is connected into a system which enables range and azimuth information on any given target appearing on the P. P. I. screen to be obtained independently of the position of the antenna of the radar system.

In systems of this general nature, the accuracy with which the range and bearing of the targets under observation are presented on the indicator screen, is dependent upon the trace on the indicator screen and on the antenna rotating at the same rate and being in coincidence with respect to azimuth. The desired rotation of the sweep may be obtained by revolving deflection coils around the cathode ray tube at a rate corresponding exactly to the rate of rotation of the antenna. However, when a second coil, arranged in close proximity to the first deflection coil, is employed in order to present a range and azimuth marker on the screen independently of the position of the antenna, a variable mutual induction between the relatively movable coils causes an inaccurate presentation of data by the main sweep by introducing random variations into the sweep current flowing in the energized main sweep deflection coil. Although both of the deflection coils employed are not energized at the same time, the lines of force produced by the energized coil cut the windings of the coil adjacently positioned. As a closed circuit is thus presented through the winding and the damping resistor shunted across the winding generally employed to provide damping during the start of the sweep and to prevent the coil from oscillating at its natural frequency and destroying the linearality of the trace produced thereby, a current is induced in the non-energized coil which in turn produces lines of force which act on the electron beam and alter the character of the sweep produced by the energized coil. Since normal operation of the system require the coils to be rotated relatively to one another, the described mutual inductance effect is variable and cannot be eliminated by a constant value compensation.

Although the mutual inductance effect between the coils may be reduced somewhat by interposing a shielding material between the coils, this expedient is unsatisfactory, because the mutual inductance effect is merely reduced and a substantial error in the indication of the main sweep remains, and because interposing the shielding material between the coils requires the one coil to be set back considerably from the flare of the tube and thereby prevents a full scale range deflection from being obtained by the lower deflecting coil.

The principal object of this invention is to provide a method of and means for eliminating mutual inductance effects between two successively-energized closely-positioned flux-producing circuits. Another object of this invention is to provide a method of and means for preventing interaction between deflection coils arranged in close proximity to each other on a cathode ray tube of a radar indicator system. A further object of the invention is to provide a radar indicator system of improved accuracy. Other objects and advantages of the invention will be apparent from the following detailed description.

It will be apparent that the invention is equally applicable to various types of electrical systems in which it is desirable to eliminate the electromagnetic interaction between two closely positioned flux-producing coils. The following disclosure made with reference to a specific embodiment of the invention in a radar system indicator, as illustrated in the accompanying drawings, is made specific only for the purpose of facilitating an understanding of the invention, and the specific embodiment disclosed is not to be construed as a limitation on the scope of the invention.

In the drawings:

Figure 1 is a schematic diagram of one form of the invention as applied to a cathode ray tube indicator;

Figure 2 is a schematic diagram illustrating the manner in which the invention may be employed in conjunction with a single conductor winding type of deflection coil; and Figure 3 is a schematic illustration of the manner in which the invention may be employed with a divided or split winding type of deflection coil.

Similar reference characters are applied to similar elements throughout the drawing.

Referring to Figure 1, a P. P. I. type radar indicator comprising a cathode ray tube 10 is provided with deflection coils 11 and 12. The sweep signal, which is applied to the deflection coil 11 to cause the radial linear deflection of the beam of the tube 10, is supplied by the main sweep generator 13 which may be triggered in any conventional manner by the master radar with which the indicator system is associated. The sweep voltage thus produced is applied to the amplifier tube 14 to control the current therethrough, the plate circuit of the tube 14 being connected to the deflection coil 11 to apply the amplified sweep signal to the coil 11 as the coil is rotated about the neck of the tube 10 at the same rate and in coincidence in azimuth with the antenna (not shown) by any conventional means, which may include a motor and synchro system indicated generally at 15.

The deflection coil 12 is rotatably mounted on the neck of the tube 10 immediately above the coil 11 and as close as possible to the flare of the tube 10 to enable the deflecting coil 12 to effect a full scale deflection of the beam of the tube without causing the beam to impinge upon the upper portion of the neck of the tube. The sweep signal applied to the coil 12 may be supplied by a range sweep generator 16 the output of which is amplified in the amplifier stage 17, the plate circuit of which supplies the sweep signal to the coil 12. The sweep signal thus produced is applied to the coil 12 only during intervals in which the main sweep coil 11 is not energized, but at sufficiently frequent intervals to cause the trace produced by the deflection coil 12 to persist on the screen of the tube 10. The coil 12 is manually adjustable in azimuth so that the range sweep produced by the coil 12 may be positioned in azimuth on any target selected from those appearing on the screen of the tube 10 as a result of the scanning action of the antenna controlled deflecting circuit comprising the coil 11. The indicator system also normally includes a range spot generator (not shown) which may be selectively adjusted to intensity-modulate the tube 10 to cause the range spot to appear at the point in the radial deflection of the range sweep which corresponds to the spot representing the target on which the range and azimuth information is desired, as more fully explained in the application of Shreve and Arensberg, previously identified.

The arrangement by which the sweep signals are applied to the deflecting coils 11 and 12, respectively, to prevent interaction between the coils which, when moved relatively to one another, cause inaccuracies in the data presented by the main sweep controlled by the coil 11 is more fully illustrated in Figures 2 and 3. In Figure 2, the coil 11 or 12 is shown as having a core 18a on which is placed the windings 18, 18' constituting an inductance coil. In Figure 3, the winding is shown as a split winding 18 and 18" which, with the core 18a, constitutes an inductance coil.

The plate circuit of the amplifier stages 14 and 17 which are illustrated in Figure 1, and shown in more detail in Figure 2, may be considered to comprise the coil windings 18, 18' and the shunting resistor 19 connected in parallel with the windings to prevent the coil from being shocked into oscillation at its natural frequency and thereby introducing errors into the deflection sweep of the main sweep circuit. In order to break the closed circuit presented by the coil windings and the damping resistor 19 which permits a current to flow through the circuit when the closely positioned deflecting coil of the other deflecting circuit is energized, unidirectional current flow device 20 is connected in series with the resistor 19 and a similar device 21 is connected in series with the coil windings. The prescribed unidirectional current flow devices 20 and 21 may consist of vacuum diodes, (as illustrated in the drawings), selenium rectifiers, or any similar type device permitting only unidirectional current flow.

The operating potential of the amplifier stage is applied at 22 as indicated, and when the amplifier stage 14 or 17 becomes conductive to the signal supplied by the sweep generators 13 or 16, current will flow through the diode 21 to the coil windings, through the damping resistor 19 and through the diode 20 to energize the coil 11 or 12, as the case may be. During the interval when the amplifier stage of the particular deflecting circuit is non-conductive, voltage induced in the deflection winding by the energization of the other deflecting coil will be presented with an open circuit as the diodes 20 and 21 are connected cathode to cathode and current passing through the diode 21 will not be passed through the diode 20. Correspondingly, since no current will flow in the coil windings as a result of the flux produced by the energized deflection circuit, no lines of flux will be produced by the windings and consequently, no interaction will occur between the closely positioned deflection coils.

In the instance a divided winding is employed in the construction of the deflection coil, as illustrated in Figure 3, in which a portion of the current is passed through both the winding 18 and the winding 18", a similar result may be obtained by inserting the diodes 21 and 21' in series with each of the divided portions of the windings 18 and 18", respectively. The operation of the coil is similar to that previously described with respect to Figure 2, in that the diodes employed are connected cathode to cathode and when the amplifier stage 14 or 17 is non-conductive, no current will flow in the non-energized deflection circuit which current would otherwise cause the non-energized coil to produce lines of flux which would cut the closely positioned energized deflection coil, or would act directly on the electron beam, and introduce irregularities in the sweep produced by the energized coil.

When employing deflection coils connected to the sweep signal in the manner described, it will be apparent that the manually controlled deflection coil 12 may be moved relatively to the antenna controlled coil 11 without causing variable mutual interaction effects in the course of the relative movement which effects result in an improper deflection of the cathode ray tube beam by the energized coil.

It will be understood that the described system may be employed in connection with various types of electrical circuits in which two flux-producing circuits are arranged in close proximity to one another and in which it is desired to eliminate the effect of the inactive circuit on the energized circuit.

We claim as our invention:

1. An electrical system comprising: two flux producing circuits, each of said circuits having inductance coils positioned adjacent to each other, a source of flux producing energy connected to said coils, means for controlling individually the flow of said energy to said coils, and means connected to said energy source and said control means for permitting the flow of said energy in said coils in but one direction and then only when permitted by said control means.

2. An electrical system comprising: a source of electrical energy; and two inductance coil units positioned adjacent each other each of said units being connected to said source; each of said units comprising a winding and a unidirectional flow device connected together in series and in parallel thereto a resistor and a unidirectional flow device connected together in series, said devices being connected in current conducting opposition with respect to voltage induced in the winding across which they are connected.

3. An electrical system comprising: a source of electrical energy; two inductance coil units positioned adjacent each other each of said units being connected to said source; each of said units comprising a winding and a unidirectional flow device connected together in series and in parallel thereto a resistor and a unidirectional flow device connected together in series; and current control devices connected between said units and one side of said energy source, said devices being connected in current conducting opposition with respect to voltage induced in the winding across which they are connected.

4. An electrical system comprising: a source of electrical energy; two inductance coil units positioned adjacent each other each of said units being connected to said source; each of said units comprising a winding and a unidirectional flow device connected together in series and in parallel thereto a resistor and a unidirectional flow device connected together in series; current control devices connected between said units and one side of said energy source, said current control devices being connected between the common connection point of the two said unidirectional flow devices in each respective unit, said devices being connected in current conducting opposition with respect to voltage induced in the winding across which they are connected.

5. An electrical system comprising: a source of electrical energy; and two inductance coil units positioned adjacent each other; each of said coil units consisting of a pair of parallel split windings and a unidirectional flow device in series with each winding respectively, a resistor and a unidirectional flow device in series therewith, the said resistor and unidirectional flow device being connected as a unit in parallel with said respective split winding and unidirectional flow device as units, said devices being connected in current conducting opposition with respect to voltage induced in the winding across which they are connected.

6. An electrical system comprising: a source of electrical energy; two inductance coil units positioned adjacent each other; each of said coil units consisting of a pair of parallel split windings and a unidirectional flow device in series with each winding respectively, a resistor and a unidirectional flow device in series therewith, the said resistor and unidirectional flow device being connected as a unit in parallel with said respective split winding and unidirectional flow device as units and connected with said devices in current conducting opposition with respect to voltage induced in the windings across which they are connected; and current control devices connected between said coil units and one side of said energy source, whereby the said energy may flow in the respective coil units in one direction only and then only when permitted by said current control device.

7. An electrical system comprising: a source of electrical energy; two inductance coil units positioned adjacent each other; each of said coil units consisting of a pair of parallel split windings and a unidirectional flow device in series with each winding respectively, a resistor and a unidirectional flow device in series therewith, the said resistor and unidirectional flow device being connected as a unit in parallel with said respective split winding and unidirectional flow device as units and connected with said devices in current conducting opposition with respect to voltage induced in the windings across which they are connected; current control devices connected between said coil units and one side of said energy source, the current control devices being connected between the common connection point of the three said unidirectional flow devices in each said unit, whereby the said energy may flow in the respective coil units in one direction only and then only when permitted by said current control device.

8. An indicator system comprising: a cathode ray tube and two beam deflection coil units mounted for rotation adjacent each other on the neck of said tube; each of said coil units consisting of a pair of parallel split windings and a unidirectionaal flow device in series with each winding respectively, a resistor and a unidirectional flow device in series therewith, the said resistor and unidirectional flow device being connected as a unit in parallel with said respective split winding and unidirectional flow device as units, said devices being connected in current conducting opposition with respect to voltage induced in the winding across which they are connected.

9. An indicator system comprising: a cathode ray tube and two beam deflection coil units mounted for rotation adjacent each other on the neck of said tube; each of said coil units consisting of a pair of parallel split windings and a unidirectional flow device in series with each winding respectively, a resistor and a unidirectional flow device in series therewith, the said resistor and unidirectional flow device being connected as a unit in parallel with said respective split winding and unidirectional flow device as units and connected with said devices in current conducting opposition with respect to voltage induced in the windings across which they are connected; and current control devices connected between said coil units and one side of said energy source, whereby the said energy may flow in the respective coil units in one direction only and then only when permitted by said current control device.

10. An indicator system comprising: a cathode ray tube and two beam deflection coil units mounted for rotation adjacent each other on the neck of said tube; each of said coil units consisting of a pair of parallel split windings and a unidirectional flow device in series with each winding respectively, a resistor and a unidirectional flow device in series therewith, the said resistor and unidirectional flow device being connected as a unit in parallel with said respectve split winding and unidirectional flow device as units and connected with said devices in current conducting opposition with respect to voltage induced in the windings across which they are connected; current control devices connected between said coil units and one side of said energy source, the said current control devices being connected between the common connection point of the three said unidirectional flow devices in each said unit, whereby the said energy may flow in the respective units in one direction only and then only when permitted by said current control device.

11. A deflection circuit comprising an amplifier tube having an anode and having a control grid to which deflection driving signal is to be applied, a deflecting coil, a unidirectional conducting device, said coil and said device being connected in series with each other and being connected between an anode supply source and said anode with the cathode of said device connected to the anode of said amplifier tube, a second unidirectional conducting device and a resistor connected in series with each other to form a series combination, said series combination being connected across said coil and said first device, the cathode of said second device being connected to the anode of said amplifier tube, said amplifier tube being biased to be substantially non-conducting in the absence of deflection driving signal on the grid of said tube.

12. A deflection circuit comprising an amplifier tube having an anode and a control grid to which deflection driving signal is to be applied, a pair of unidirectional conducting devices each having a cathode and an anode, said cathodes being connected to the anode of said tube, a deflecting coil connected between the anode of one of said devices and a source of positive operating voltage, and a damping resistor connected between the anode of said other device and said source of operating potential.

13. In combination, two deflecting coils which are located adjacent to each other whereby deflection current in one coil may induce voltage in the other coil, an amplifier tube having an anode and a control grid to which deflection driving signal is to be applied, a pair of unidirectional conducting devices each having a cathode and an anode, said cathodes being connected to the anode of said tube, one of said deflecting coils being connected between the anode of one of said devices and a source of positive operating voltage, and a damping resistor connected between the anode of said other device and said source of operating potential, and a second amplifier tube having an anode and a control grid to which deflection driving signal is to be applied, a second pair of unidirectional conducting devices each having a cathode and an anode, said cathodes of said second pair being connected to the anode of said second tube, the other deflecting coil being connected between the anode of one of said devices on said second pair and a source of positive operating voltage, and a second damping resistor connected between the anode of the other device of said second pair and said source of operating potential.

References Cited in the file of this patent

UNITED STATES PATENTS

| | | |
|---|---|---|
| 2,149,077 | Vance | Feb. 28, 1939 |
| 2,436,447 | Packard | Feb. 24, 1948 |
| 2,445,017 | Boadle | July 13, 1948 |
| 2,451,641 | Torsch | Oct. 19, 1948 |
| 2,460,601 | Schade | Feb. 1, 1949 |